(No Model.) 3 Sheets—Sheet 1.
W. E. PRALL.
STREET CAR MOTOR.
No. 457,793. Patented Aug. 18, 1891.
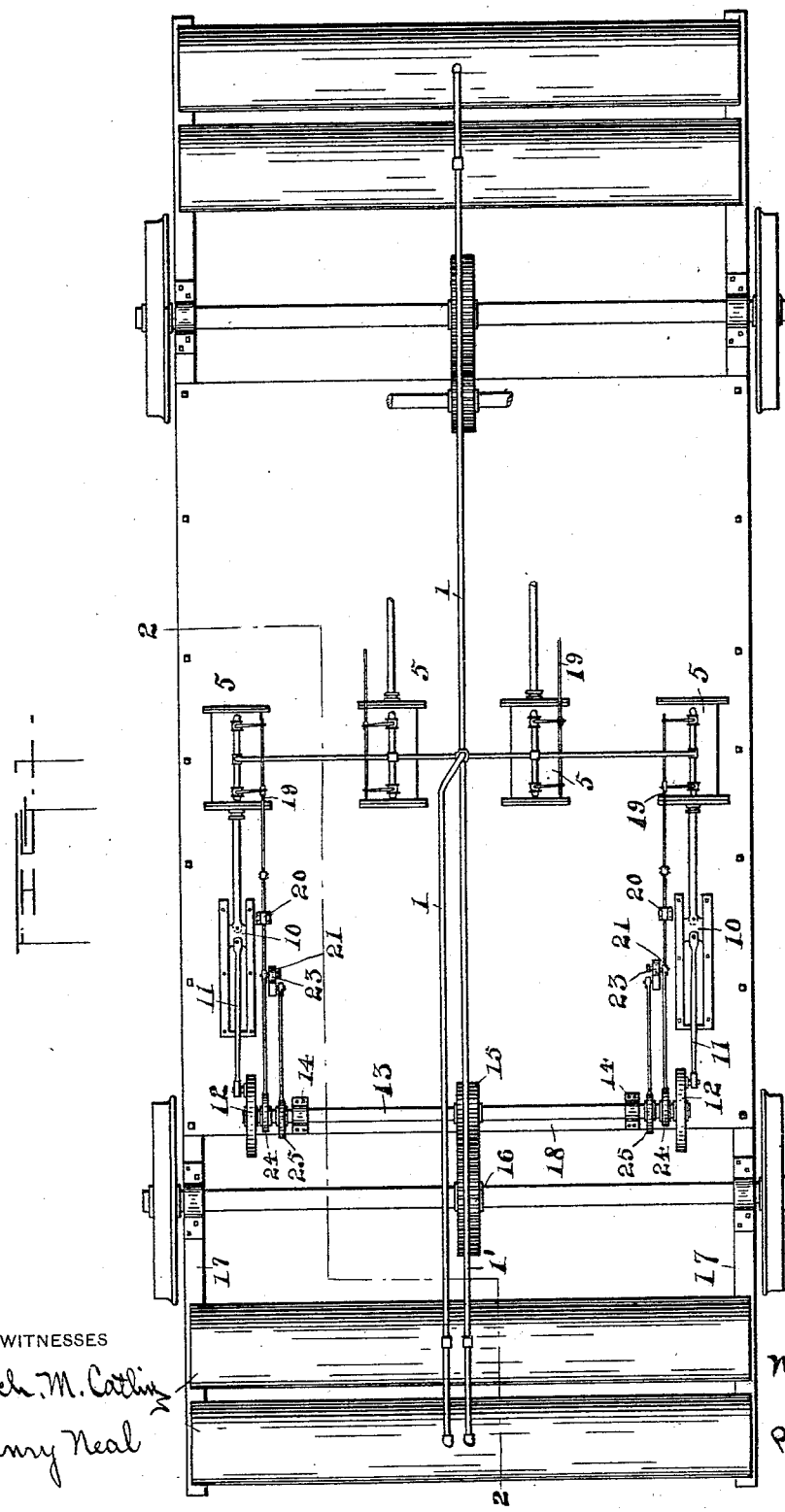
WITNESSES
Arch. M. Catlin
Henry Neal
INVENTOR
William E. Prall
by
Benj. R. Catlin
Atty.

(No Model.) 3 Sheets—Sheet 2.
W. E. PRALL.
STREET CAR MOTOR.
No. 457,793. Patented Aug. 18, 1891.
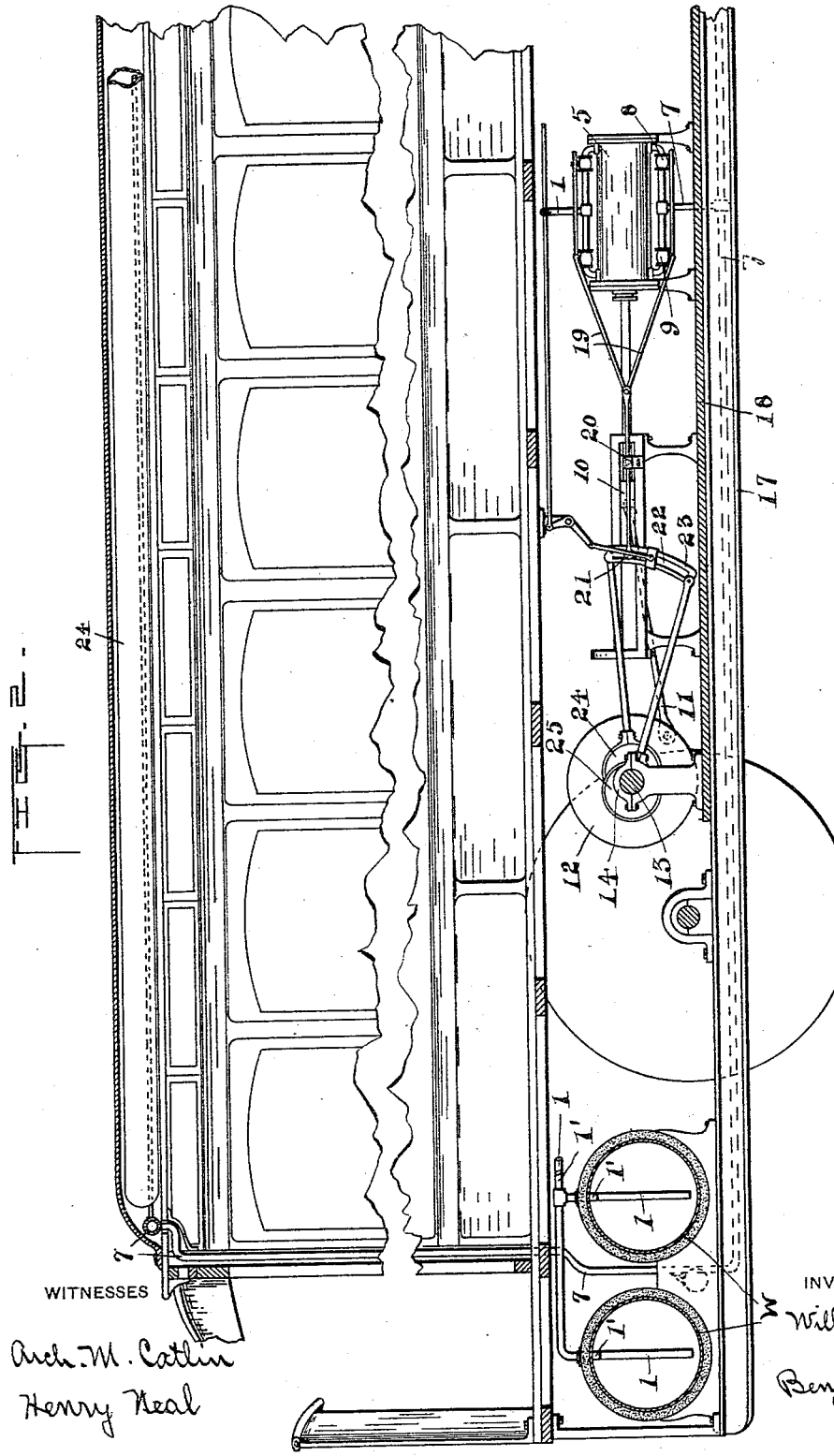
WITNESSES
Arch. M. Catlin
Henry Neal
INVENTOR
William E. Prall
by
Benj. R. Catlin
Atty.

(No Model.) 3 Sheets—Sheet 3.
W. E. PRALL.
STREET CAR MOTOR.
No. 457,793. Patented Aug. 18, 1891.
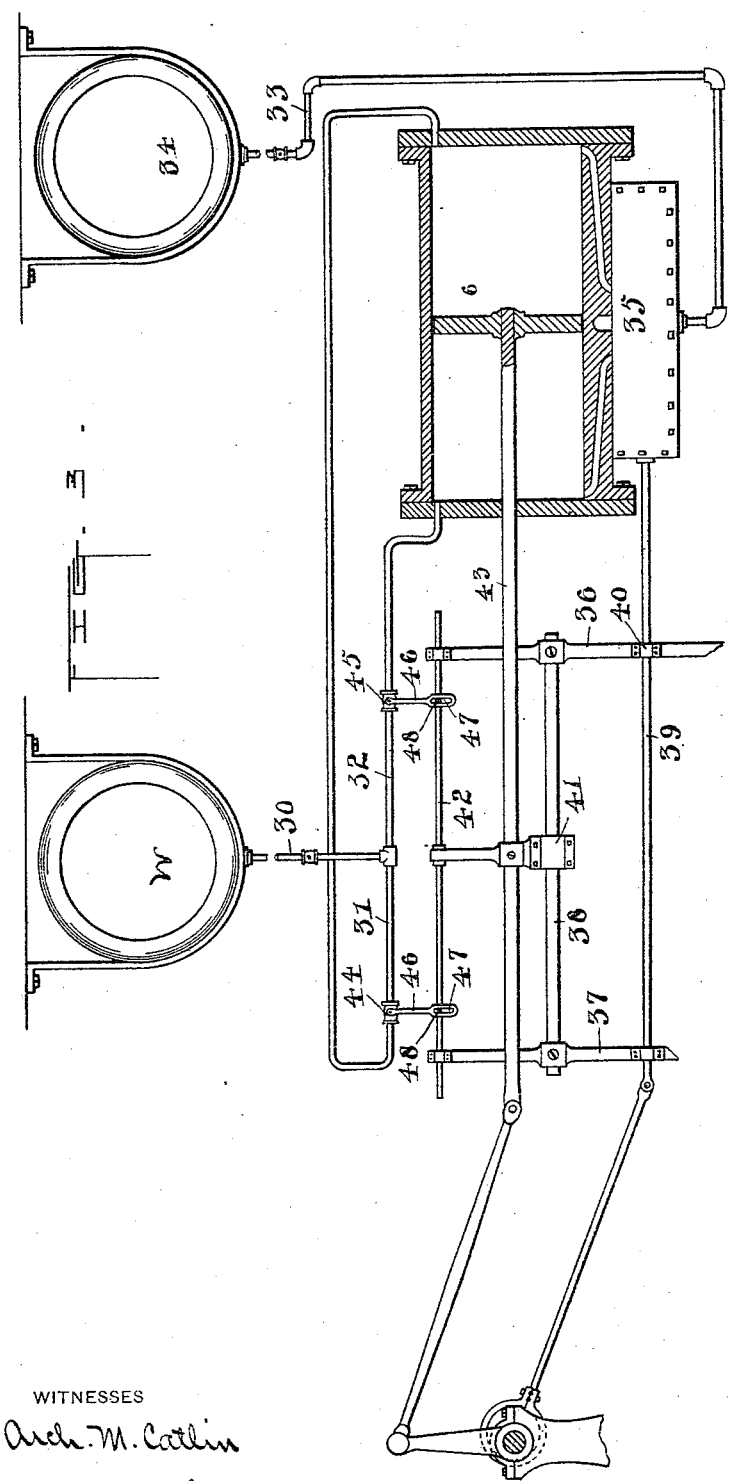
WITNESSES
Arch. M. Catlin
Henry Neal
INVENTOR
William E. Prall
by
Benj. R. Catlin
atty.

UNITED STATES PATENT OFFICE.

WILLIAM EDGAR PRALL, OF WASHINGTON, DISTRICT OF COLUMBIA.

STREET-CAR MOTOR.

SPECIFICATION forming part of Letters Patent No. 457,793, dated August 18, 1891.

Original application filed March 11, 1891, Serial No. 384,603. Divided and this application filed June 1, 1891. Serial No. 394,755.

(No model.)

*To all whom it may concern:*

Be it known that I, WILLIAM EDGAR PRALL, a resident of Washington, in the District of Columbia, have invented certain new and useful Improvements in Street-Car Motors; and I do hereby declare the following to be a full, clear, and exact description of the invention, such as will enable others skilled in the art to which it pertains to make and use the same.

The invention has relation to an engine adapted to utilize heat previously stored in water and to means of controlling the admission of water to the engine-cylinder and removing water or steam from the same. It has been proposed in my application, Serial No. 384,603, filed March 11, 1891, of which this is a division, to use highly-heated water under pressure in connection with compressed air to propel an engine, the air and water being mingled in an intermediate receiver, from which they were passed through the valve-chest of the engine-cylinder. According to the present improvement water is admitted directly to the cylinder through ports distinct from the exhaust-ports, whereby heating of the exhaust is avoided, and, further, the mixing of air and water under pressure before the introduction to the cylinder is avoided.

The invention consists in the construction hereinafter described and pointed out.

In the drawings, Figure 1 is a partial plan of the improved device. Fig. 2 is a section on line 2 2, Fig. 1; and Fig. 3 is a plan of a modified arrangement of cock-controlling devices.

In Fig. 1 are shown four cylinders 5, two of which are connected by cross-heads 10, connecting-rods 11, and crank-wheels 12, with a shaft 13, supported to turn in bearings 14 and provided with a pinion 15, gearing with wheel 16 on a car-axle. These parts and others to be described are supported in the present instance by beams 17, and platform 18, upheld by said beams, the whole being suitably sustained from the axles of the car.

The reference-letter W denotes tanks adapted to hold water heated, preferably, to 400° Fahrenheit or above. Said tanks are thoroughly protected against loss of heat by radiation in any approved manner. The water-pipe 1 may thus also be protected. This pipe communicates by means of branches with the lower part of the tanks, and it is provided with branches supplied with cocks 2 and 3 for controlling admission of water to the cylinders 5 on either side of the piston 6. An exhaust-pipe is indicated by 7, which has two cocks 8 and 9, adapted to open and close communication with the cylinder. The construction and arrangement are such that water can be admitted alternately on each side of the piston.

The branches of the water-supply pipe have openings in the cylinder-wall and communicate directly with its interior, and distinct exhaust-ports are provided, whereby the cooling effect of a valve-chest upon the water and also wasteful heating of the exhaust are avoided. This is of especial importance in a car-motor and in combination with a system employing hot water. If, for example, the hot water were admitted through a valve-chest of a street-car engine, said valve-chest would detract from the heat of the water in it so as to impair its efficiency, and it would become cold at times, as when the car was running by gravity, the engine being at rest. If at such times it were desired to suddenly start up the engines to ascend an upgrade, the cooled contents of the valve-chest would be an obstruction. Furthermore, under ordinary conditions, if the exhaust-ports be contiguous to the inlets for hot water the exhaust is unnecessarily heated at the expense of the water.

As represented in Fig. 1, the several cocks are provided with crank-arms pivotally connected to and adapted to be operated by the rods 19, which are suitably connected to cross-heads movably supported in guides 20. Each cross-head has a pin 21, working in slot 22 of the link 23, which link has its ends connected by straps with eccentrics 24 and 25, secured on the shaft 13. The link can be moved in usual manner to vary the stroke of the connecting-rods, by which the opening or closing of the inlet and exhaust cocks is controlled, and by this means the stroke of the piston and speed and direction of the car can be governed.

24 denotes condensers, located, in the present instance, on the top of the car. These consist of wire-cloth tubes, elliptical in cross-section, covered with fibrous material. The exhaust-pipes 7 have perforated branches extending into the interior of these condenser-tubes and adapted to discharge steam therein. The water of condensation may be received in a receptacle formed or located on the top of the car and disposed of in any convenient or usual way.

Fig. 3, which is to some extent diagrammatic, indicates another construction and arrangement and one adapted to use both air and water and to introduce these agents separately into the engine-cylinder. According to this arrangement the water is fed directly to the cylinder, as in that first described, and air is supplied through a suitable valve-chest. The hot-water pipe 30, leading to a tank W, stored with highly-heated water under pressure, has two branches 31 and 32, which communicate with the cylinder at opposite ends. The air-pipe 33, leading from a tank 34, holding compressed air, communicates with the valve-chest 35, of usual form and adapted to admit air and to exhaust.

36 and 37 are posts or supports for the guide-rod 38. The valve-rod 39 is loosely supported by a bracket or straps 40.

41 is a cross head or bar movable on rod 38, but fixed to the piston-rod 43. Rod 38 is fixed in posts 36 and 37. The piston-rod is suitably moved to and fro through the medium of the cross-head and the air and exhaust valve by eccentrics, as shown.

44 and 45 are cocks provided with crank-arms 46, which have slots 47, embracing pins 48, fast on the movable rod 42.

Compressed air and water are separately admitted to the cylinder, and their admission is controlled by the above-described devices. The air is admitted by the operation of the valve-rod and valve, as in steam-engines. Let it be assumed that, as represented, air and water are being admitted behind the piston and that cock 44 is open and 45 closed and that the piston is moving to the right. The construction is such that as soon as the cross-head 41, moving loosely on rod 42, is carried by the piston against the crank-arm of cock 44 the latter will be closed and the cock 45 opened, the rod 42 being suitably moved, through the medium of pins 48, by the impact of cross-head 41 upon the arm 46 of cock 44. This closing of the cock 44 and opening of the cock 45 will occur when the outer piston has moved to the right nearly the whole length of its stroke. At the same time the air-valves will be reversed to exhaust behind the piston and to permit air under pressure to enter in front, whereupon both air and water will be admitted in front until the cross-head 41 strikes arm 46 at the left and reverses the cocks, at which moment the air-valves will also be reversed. The water, being supplied at a high temperature, expands into steam in the cylinder, and it and the air co-operate to drive the engine. In practice they may be used expansively and in such quantity and proportion as to utilize efficiently the heat of the water, which will preferably constitute the main source of power. It is not essential that the admission of air and water be entirely contemporaneous or of equal duration, or that air be admitted at all. The main advantage of the use of water is derived from its high specific heat, whereby it can be made to retain and convey sufficient heat within a moderate compass to run a car or other vehicle. Thus a thousand pounds of water heated to 400° Fahrenheit contains about three hundred and fifty thousand units of heat, representing twelve horse-power. This would in practice enable an ordinary street-car to run a trip of twenty-five miles.

The invention contemplates the employment of a tank or tanks of sufficient capacity to contain water in quantity to drive a vehicle such as a street-car for a trip without the necessity of using other power or of carrying a boiler.

1' is a pipe by which the upper part of the water-tanks communicate with pipe 1, leading to the engine-cylinders. By means of this pipe steam can be supplied to the engine, and it, together with the water and air pipes suitably furnished with cocks, affords means for utilizing steam, air, or hot water—any one, two, or all, as desired—to run the engine. The use of steam is not ordinarily desirable, for the reason that loss by wire-drawing at high pressure far exceeds that in the use of water, owing to the fact that its volume is very much greater. Furthermore, steam cannot be drawn from the water-tank without diminishing its pressure, which when reduced to about sixty pounds corresponds to a temperature too low for efficient work. In case water alone is used from the water-tank, the heat and pressure are maintained in it without material diminution, so that its contents can be wholly utilized at approximately the initial pressure. While, therefore, a hot-water tank having the pressure and temperature indicated could be used to furnish steam, thereby dispensing with a portable fire and supplementing compressed air, such use is not preferred.

I do not claim herein an engine adapted to be driven by hot water, nor a cylinder having direct inlet-ports and distinct exhaust-ports. It is characteristic of my improvement that highly-heated water carried on a car under pressure in a tank disconnected from a boiler is admitted to the engine-cylinder by pipes opening directly into the cylinder, said inlet-pipes being distinct and separate from the exhaust-ports, which latter ports are specially adapted for exhausting water.

Having thus described my invention, what I desire to secure by Letters Patent is—

1. The combination of an engine, a hot-water-storage tank located on and adapted to be carried with a vehicle and disconnected from a fire, said tank being charged with highly-heated water under pressure in quantity suitable to drive the vehicle for a trip, substantially as specified, inlet-pipes opening directly through the wall of the engine-cylinder, whereby water can be conveyed from the tank to the interior of said cylinder and introduced directly therein, distinct ports disconnected from said inlet-pipes suitable for exhausting water from the cylinder, cocks, or valves, and devices for operating said cocks or valves to alternately admit water upon each side of the cylinder-piston and exhaust it from the other, substantially as set forth.

2. The combination of an engine, a hot-water-storage tank located on and adapted to be carried with a vehicle and disconnected from a fire, said tank being charged with highly-heated water under pressure in quantity suitable to drive the vehicle for a trip, substantially as specified, inlet-pipes opening directly through the wall of the engine-cylinder, whereby water can be conveyed from the tank to the interior of said cylinder and introduced directly therein, distinct ports disconnected from said inlet-pipes suitable for exhausting water from the cylinder, cocks or valves, and devices for operating said cocks or valves to alternately admit water upon each side of the cylinder-piston and exhaust it from the other, and devices for separately introducing compressed air to the engine-cylinder, substantially as set forth.

3. The combination of an engine, a hot-water-storage tank, inlet-pipes opening directly through the wall of the engine-cylinder, whereby water can be conveyed from the tank to said cylinder and introduced directly therein, distinct ports suitable for exhausting water from the cylinder, cocks or valves, and devices for operating said cocks or valves to alternately admit water upon each side of the cylinder-piston and exhaust it from the other, and devices for separately introducing compressed air to the engine-cylinder, consisting of mechanism mediately connected with the piston, substantially as set forth.

4. The combination of a hot-water-storage tank W, carried on a car, an engine-cylinder, a pipe and branches connecting the cylinder and said tank, and branches opening directly into the cylinder, a tank for compressed air, a pipe to carry it to the cylinder, exhaust-ports distinct from the inlets leading from the tank W to the cylinder, and suitable cocks for the inlets and exhaust-ports, the latter being specially adapted to exhaust water, substantially as set forth.

5. The combination of a hot-water-storage tank W, carried on a car, an engine-cylinder, a pipe and branches connecting the cylinder and said tank, said branches opening directly into the cylinder, exhaust-ports distinct from the inlets leading from the tank W to the cylinder, and suitable cocks for the inlets and exhaust-ports, the latter being specially adapted to exhaust water, substantially as set forth.

In testimony whereof I have signed this specification in the presence of two subscribing witnesses.

WILLIAM EDGAR PRALL.

Witnesses:
BENJ. R. CATLIN,
ARCH. M. CATLIN.